(12) United States Patent
Kojima et al.

(10) Patent No.: US 10,202,925 B2
(45) Date of Patent: Feb. 12, 2019

(54) INTERNAL COMBUSTION ENGINE CONTROLLER

(71) Applicant: Hitachi Automotive Systems, Ltd., Hitachinaka-shi, Ibaraki (JP)

(72) Inventors: Satoshi Kojima, Hitachinaka (JP); Takuya Mayuzumi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 161 days.

(21) Appl. No.: 15/121,696

(22) PCT Filed: Jan. 19, 2015

(86) PCT No.: PCT/JP2015/051160
§ 371 (c)(1),
(2) Date: Aug. 25, 2016

(87) PCT Pub. No.: WO2015/129325
PCT Pub. Date: Sep. 3, 2015

(65) Prior Publication Data
US 2016/0363076 A1 Dec. 15, 2016

(30) Foreign Application Priority Data
Feb. 27, 2014 (JP) ................ 2014-036142

(51) Int. Cl.
*B60L 11/18* (2006.01)
*H02M 3/156* (2006.01)
(Continued)

(52) U.S. Cl.
CPC .............. *F02D 41/20* (2013.01); *B60L 11/18* (2013.01); *H02M 3/156* (2013.01);
(Continued)

(58) Field of Classification Search
CPC ............ F02D 41/20; F02D 2041/2006; F02D 2041/201; F02D 2041/2017;
(Continued)

(56) References Cited

U.S. PATENT DOCUMENTS

2006/0284607 A1* 12/2006 Isobe .................... H02M 3/156
323/282
2009/0015223 A1   1/2009 Kakehi
2009/0107469 A1*  4/2009 Takahashi ............... F02D 41/20
123/490

FOREIGN PATENT DOCUMENTS

JP        63-156585 U     10/1988
JP         9-285108 A     10/1997
(Continued)

OTHER PUBLICATIONS

International Search Report (PCT/ISA/210) issued in PCT Application No. PCT/JP2015/051160 dated Apr. 21, 2015 with English-language translation (four (4) pages).
(Continued)

*Primary Examiner* — Hal Kaplan
(74) *Attorney, Agent, or Firm* — Crowell & Moring LLP

(57) ABSTRACT

According to the present invention, by providing control whereby a rising slope or a descending slope of step-up current flowing to a step-up coil is detected, and corrections are made to step-up switching control, the step-up upper and lower limit current values of the step-up circuit can be controlled within intended current threshold values regardless of constant modifications or change in characteristics due to fluctuations of the battery power supply voltage or degradation of step-up circuit elements over time; heat emission by step-up circuit elements can be kept to a minimum; and the step-up recovery time can be adjusted to a constant value regardless of the slope of the step-up current.

15 Claims, 10 Drawing Sheets

(51) Int. Cl.
  *H02M 3/157*   (2006.01)
  *F02D 41/20*   (2006.01)
(52) U.S. Cl.
  CPC .......... *F02D 2041/201* (2013.01); *F02D 2041/2006* (2013.01); *F02D 2041/2017* (2013.01); *F02D 2041/2027* (2013.01); *F02D 2041/2034* (2013.01); *F02D 2041/2044* (2013.01); *F02D 2041/2048* (2013.01); *F02D 2041/2065* (2013.01); *F02D 2041/2086* (2013.01); *F02D 2200/503* (2013.01); *H02M 3/157* (2013.01)
(58) Field of Classification Search
  CPC ..... F02D 2041/2027; F02D 2041/2034; F02D 2041/2044; F02D 2041/2048; F02D 2041/2065; F02D 2041/2086; F02D 2200/503; H02M 3/156; H02M 3/157; B60L 11/18
  USPC .................................................. 307/9.1, 10.1
  See application file for complete search history.

(56) References Cited

FOREIGN PATENT DOCUMENTS

| | | |
|---|---|---|
| JP | 2001-55948 A | 2/2001 |
| JP | 2002-153047 A | 5/2002 |
| JP | 2009-22139 A | 1/2009 |
| JP | 2010-279150 A | 12/2010 |
| JP | 2012-139084 A | 7/2012 |

OTHER PUBLICATIONS

Japanese-language Written Opinion (PCT/ISA/237) issued in PCT Application No. PCT/JP2015/051160 dated Apr. 21, 2015 (seven (7) pages).

\* cited by examiner

STEP-UP SWITCHING CURRENT (160A)

STEP-UP SWITCHING CURRENT (160A) ENLARGED VIEW

FIG. 8A  STEP-UP VOLTAGE (100A)
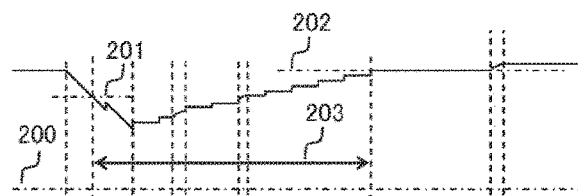
FIG. 8B  STEP-UP SWITCHING CURRENT (160A)
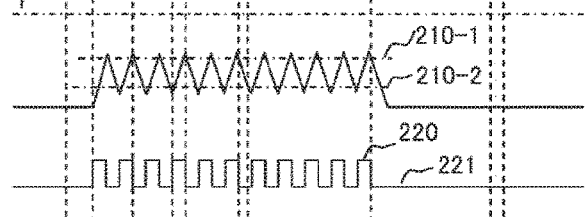
FIG. 8C  STEP-UP CONTROL SIGNAL (151B)
FIG. 8D  CHARGE CURRENT (140A)
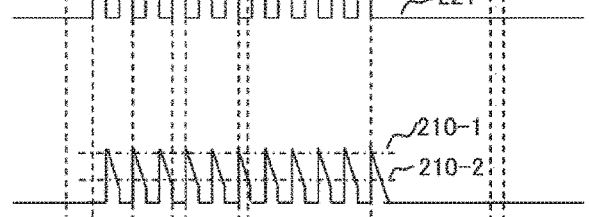
FIG. 8E  INJECTOR CURRENT (3A)
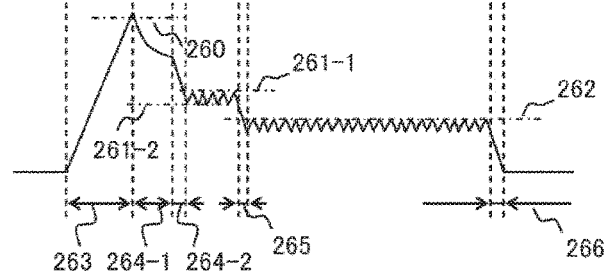

INTERNAL COMBUSTION ENGINE CONTROLLER

TECHNICAL FIELD

The present invention relates to an internal combustion engine controller.

BACKGROUND ART

The present invention relates to an internal combustion engine controller that drives a load by using a high voltage, which is an increased battery power supply voltage, in an automobile, a motorcycle, a farm machine, a working machine, a vessel machine or the like using, for example, gasoline or light oil as fuel, and particularly relates to an internal combustion engine controller suitable for driving an in-cylinder direct-injection-type injector. The background techniques of the present technical field include, for example, Patent Literature listed below.

CITATION LIST

Patent Literature

PTL 1: JP 2001-55948 A
PTL 2: JP 09-285108 A
PTL 3: JP 2009-22139 A

SUMMARY OF INVENTION

Technical Problem

The present invention provides an internal combustion engine controller that carries out corrections with respect to a step-up switching stop operation and a step-up switching start operation of a step-up controller in consideration of the overshoot and undershoot due to delays of a step-up control circuit when a battery voltage and the characteristics of electronic parts mounted on a step-up circuit are changed, thereby carrying out accurate control to obtain step-up upper/lower-limit current threshold values set in advance.

Solution to Problem

In order to achieve the above-described object, an internal combustion engine controller according to the present invention includes: a step-up coil connected to a battery power source and configured to increase a voltage of the battery power source; a switch element connected to the step-up coil and configured to distribute or shut off a current to the step-up coil; a step-up capacitor configured to accumulate current energy of an inductance component from the step-up coil; and a step-up control circuit configured to control the step-up switching element by a value of a step-up current distributed to the step-up coil to charge the step-up capacitor with a high voltage generated at the step-up coil, wherein, the step-up control circuit measures a slope of the step-up current value and corrects on/off control of the switching element.

Advantageous Effects of Invention

According to the present invention, regardless of fluctuations of a battery power supply voltage, changes in characteristics of step-up circuit elements caused by degradation over time, and constant modifications, the step-up current value of the step-up circuit can be controlled within set current threshold values, and heat generation of the step-up circuit elements can be suppressed to a minimum level. Moreover, regardless of the slope of the step-up current value, the step-up recovery time can be constantly adjusted.

BRIEF DESCRIPTION OF DRAWINGS

FIGS. 8A to 8E are a diagram showing entire operation waveforms for specifying the new problems.

DESCRIPTION OF EMBODIMENTS

Hereinafter, preferred embodiments of the present invention will be described based on the accompanying drawings, and new problems will be also described.

Figure 7:
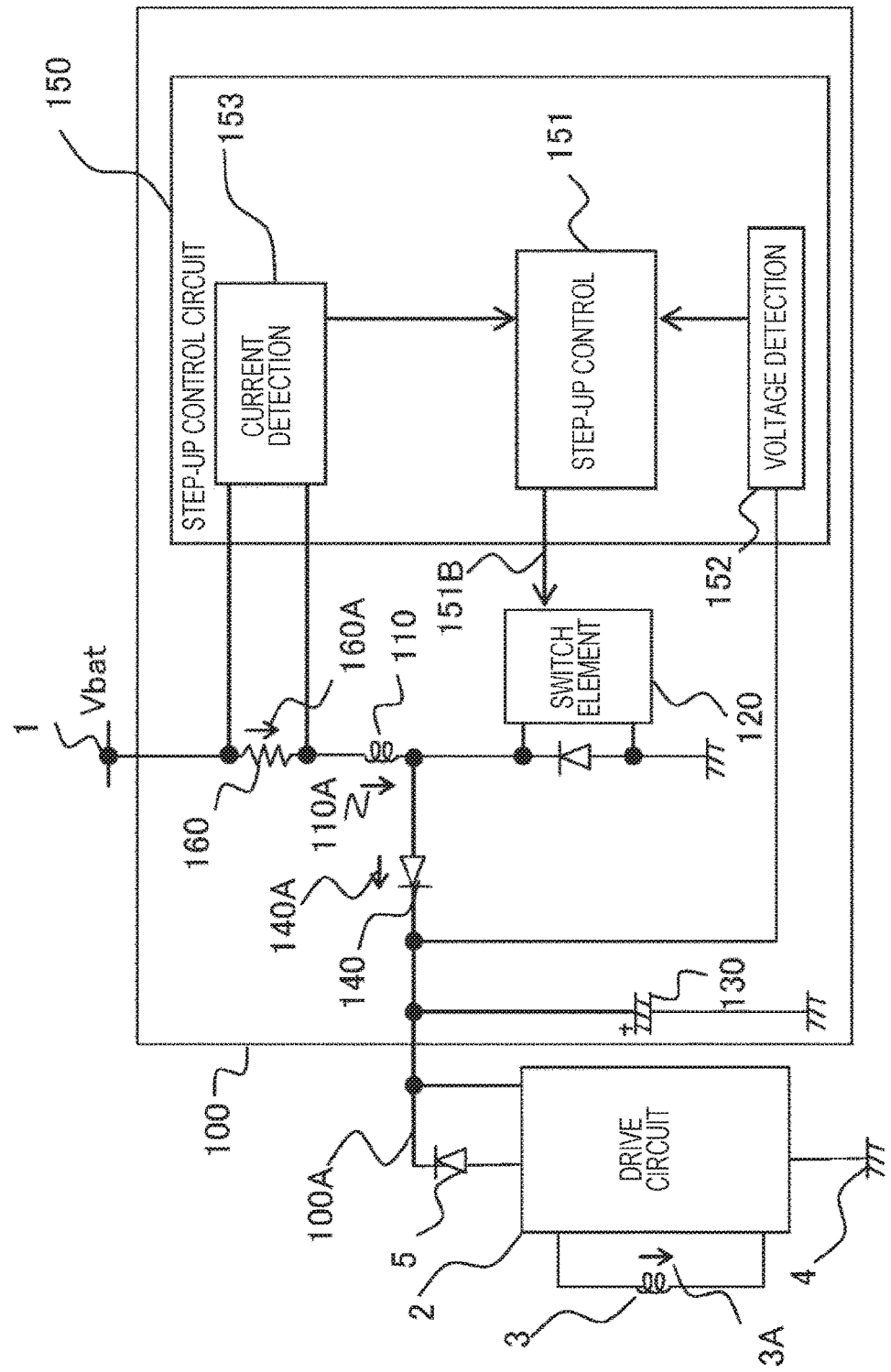
FIG. 7 is a diagram showing a circuit for specifying the new problems.

Compared with a method of injecting fuel to a conventional indirect injection-type injector, in other words, to an air-intake passage or an air-intake port and forming a gas mixture of the fuel and air, an engine using an in-cylinder direct-injection-type injector is required to use the fuel pressurized to a high pressure and therefore requires high energy (voltage) in a valve-opening operation of the injector. Moreover, in order to improve the controllability of the injector and support high-speed drive, high energy is required to be supplied to the injector in a short period of time. Many conventional internal combustion engine controllers, which control injectors of internal combustion engines, employ a method in which the distribution current distributed to an injector is increased by using a step-up circuit, which increases the voltage of a battery power source. FIG. 7 is a circuit diagram showing an internal combustion engine controller used for specifying the new problems. As shown in FIG. 7, the internal combustion engine controller is provided with a step-up circuit 100. The step-up circuit 100 is disposed between a drive circuit (2), which drives a direct-injection injector (3), and a battery power source (1), increases the voltage thereof to a voltage higher than a battery power supply voltage Vbat in a short period of time, and supplies the step-up voltage 100A to the drive circuit 2. The step-up circuit 100 has a step-up coil 110, which increases the voltage of the battery power source; a switch element 120, which turns on/off the power distribution to the step-up coil 110; and a step-up capacitor 130, which is inserted in parallel to the switch element 120 via a charge diode 140 for backflow prevention and accumulates the energy from the step-up coil 110. A step-up control circuit 150, which carries out on/off control of the switch element 120, is connected to the switch element 120. The step-up control circuit 150 has a step-up control unit 151, which control s drive of the switch element 120; a voltage detection unit 152, which detects the charge voltage of the step-up capacitor 130; and a current detection unit 153, which detects a step-up current 110A flowing through the switch element 120 and the step-up circuit 140 by a current detection resistor 160. If the switch element 120 is turned on by control of the step-up control unit 151, a current flows from the battery power source 1 to the step-up coil 110 through the switch element 120, and energy is accumulated in the step-up coil 110. If the switch element 120 is turned off, the current flowing to the step-up coil 110 is shut off, and the step-up capacitor 130 is charged with electric energy by an inductance component of the step-up coil 110.

FIG. 8(e) used for specifying the new problems is an example of current waveforms of an injector current 3A distributed to the direct-injection injector 3. As shown in FIG. 8(e), at the beginning of power distribution of the injector 3, the injector current 3A is increased to an upper-limit peak current 260 determined in advance by the step-up voltage 100A in a short period of time (peak-current distribution period 263). The peak current value thereof is about 5 to 20 times larger than the peak current value of an injector current flowing in an injector of a conventional indirect injection method.

After the peak-current distribution period 263 is finished, the energy supply source to the injector 3 makes a transition from the step-up voltage 100A to the battery power source 1, is controlled to first retention stop currents 261-1 to 261-2, which are the currents about ½ to ⅓ of the peak current, and is then controlled to a second retention stop current 262, which is the current about ⅔ to ½ of the first retention stop currents. In the period in which the peak current 260 and the first retention stop currents are distributed, the injector 3 opens a valve and injects fuel into a cylinder.

The process of making the transition from the upper-limit peak current 260 to the first retention stop currents is determined by: magnetic-circuit characteristics and fuel-spray characteristics of the injector 3, the fuel pressure of a common rail which supplies the fuel to the injector 3, an injector-current distribution period corresponding to a fuel supply amount determined by the motive power required for the internal combustion engine, etc. This process includes, for example, a case in which the current is decayed in a short period of time, a case in which the current is gently decayed, or a case in which, as shown in FIG. 8(e), the current is gently decayed in a peak-current slow-descending period 264-1 and the current is decayed in a short period of time in a peak-current rapid-descending period 264-2.

In the internal combustion engine controller, in order to quickly carry out valve-closing of the injector 3 when fuel injection is finished, a distribution-current descending period 266 (period of decaying from the second retention stop current 262) of the injector distribution current 3A has to be shortened to shut off the injector current 3A. Furthermore, also in the process 264-2 in which the peak current 260 is lowered to the first retention stop current 261-1 and in a process 265 in which the first retention stop current 261-2 is lowered to the second retention stop current 262, the injector current 3A has to be decayed in a short period of time in some cases.

However, since the injector current 3A is flowing to a drive coil of the injector 3, high energy caused by the inductance of the coil is accumulated. In order to lower the injector current 3A, this accumulated energy has to be eliminated from the injector 3. Examples of the method of realizing the elimination of the accumulated energy from the injector drive coil in the distribution-current descending period 266, which is a short period of time, include a method of converting power-distribution energy to thermal energy by utilizing zener diode effects in a drive element of the drive circuit 2 forming the injector current 3A and a method of carrying out regeneration to the step-up capacitor 130, which is for drive energy of the injector drive coil, via a current regenerative diode 5 disposed between the drive circuit 2 and the step-up circuit 100.

The above-described method of conversion to thermal energy can simplify the drive circuit 2 but is not suitable for a drive circuit which distributes a large current since the power-distribution energy of the injector 3 is converted to thermal energy.

On the other hand, the above-described method of regeneration to the step-up capacitor 130 is capable of relatively suppressing heat generation of the drive circuit 2 even when a large current flows to the injector 3 and is therefore particularly widely used in engines in which the distribution current to the injector 3 is large such as an engine using a direct-injection injector using light oil (sometimes also referred to as "common-rail engine") and an engine using a direct-injection injector using gasoline as fuel.

A controller that uses a step-up circuit that regenerates the accumulated energy of an injector drive coil to a step-up capacitor is shown, for example, in PTL 1. Herein, operation of the step-up circuit will be described by using FIGS. 7 and 8 again.

The drive circuit 2 distributes the injector current 3A to the injector 3 by using the step-up voltage 100A of the step-up circuit 100. As a result, as shown in FIG. 8(a), when a fact that the step-up voltage 100A is reduced to a voltage 201 or lower serving as a sign of a step-up start is detected by the voltage detection unit 152, the step-up control unit 151 starts a step-up operation (in FIG. 8(a), reference sign 200 represents 0 [V]). The step-up control unit 151 changes a step-up control signal 151B, which is for distributing power to the switch element 120, from LOW to HIGH. As a result, the switch element 120 is turned on, a current 160A flows from the battery power source 1 to a current detection resistor 160, the current 110A flows to the step-up coil 110, and energy is accumulated in the step-up coil 110. Herein, the current 160A and the current 110A have the same current value. The step-up coil current 110A flowing through the step-up coil 110 is converted to a voltage as the step-up current 160A by the current detection resistor 160 and is detected by the current detection unit 153. The waveforms of the step-up switching current 160A detected by the current detection unit 153 are as shown in FIG. 8(b). As shown in FIG. 8(b), when the step-up switching current 160A exceeds a switching stop current 210-1 set in advance, the step-up control unit 151 changes the step-up control signal 151B, which controls opening/closing of the switch element 120, from HIGH to LOW and shuts off the step-up switching current 160A. As a result of this shut-off, the current flowing to the step-up coil 110 can no longer flow to a ground 4 through the switch element 120, and the energy accumulated by the inductance component of the step-up coil 110 generates a high voltage. If the voltage of the step-up coil 110 becomes higher than the voltage obtained by adding the step-up voltage 100A accumulated in the step-up capacitor 130 and a forward voltage of the charge diode 140, the energy accumulated in the step-up coil 110 makes a transition to the step-up capacitor 130 as a charge current 140A through the charge diode 140. The charge current 140A starts from the level of the current which has been flowing to the step-up coil 110 immediately before the switch element 120 is shut off, in other words, from the level of the switching stop current 210-1 and is rapidly reduced.

If it is detected that the step-up voltage 100A increased by the above-described operation is less than a voltage 202 of a predetermined step-up stop level, the step-up control unit 151 detects by the current detection unit 153 that the level of the current flowing to the charge diode 140 has become a switching start current 210-2 and changes the step-up control signal 151B from LOW to HIGH in order to cause the switch element 120 to distribute power. This operation is repeated until the step-up voltage becomes the voltage 202 of the predetermined step-up stop level (step-up recovery time 203).

On the other hand, when shut-off or short-time decaying of the injector current 3A is started by the drive circuit 2, a regeneration current from the injector 3 flows to the step-up capacitor 130 through the current regenerative diode 5 during the distribution-current descending period 266, the peak-current rapid-descending period 264-2, and the first retention-stop-current descending period 265. As a result, as well as the step-up operation by the step-up coil 110, the energy accumulated by the inductance component of the injector 3 makes a transition to the step-up capacitor 130, and the step-up voltage 100A is increased.

As described above, compared with a step-up circuit that carries out control by the time determined in advance without detecting the step-up switching current 160A (for example, see PTL 2), the step-up circuit 100 that detects the step-up switching current and the current 160A flowing to the charge diode and carries out control so that the current 160A does not become equal to or higher than the switching stop current 210-1 and equal to or lower than the switching start current 210-2 is capable of suppressing the step-up switching current 160A to a low level. Therefore, the step-up circuit 100 is capable of suppressing heat generation of the switch element 120, the step-up coil 110, and the charge diode 140 to a minimum level.

Figure 6A:
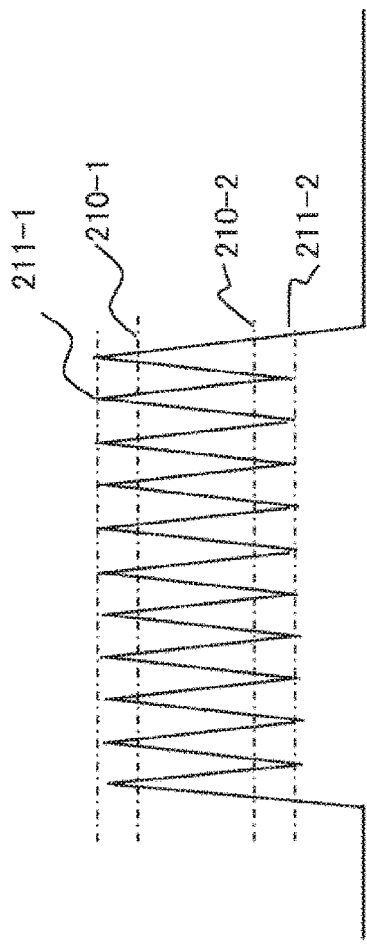
FIGS. 6A and 6B are diagrams showing step-up operation waveforms for specifying new problems.
Figure 6B:
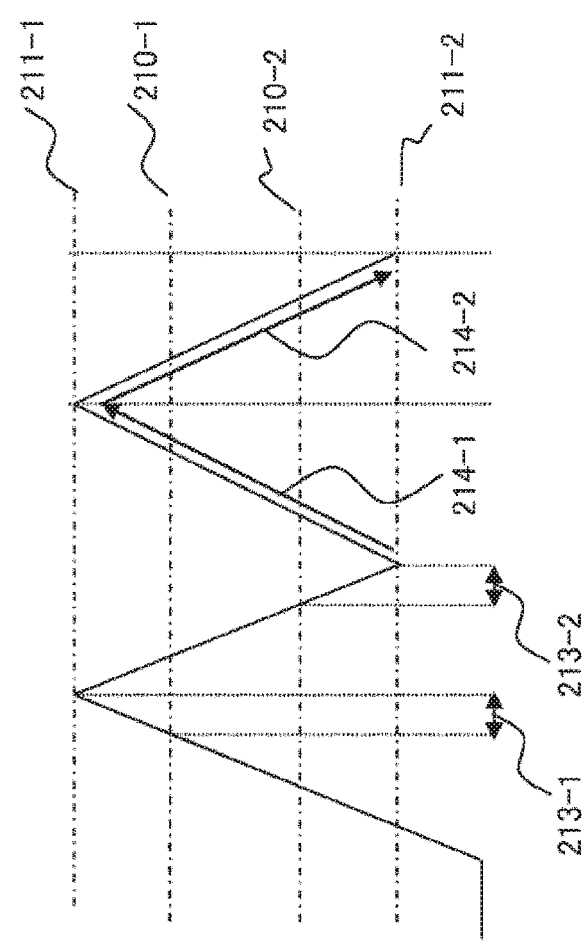

However, in the above description, as shown in FIGS. 6(a) and 6(b), in the method of detecting the switching stop current 210-1 serving as a target and the switching start current 210-2 serving as a target and controlling HIGH and LOW of the step-up control signal 151B, switching-off delay time 213-1 and switching-on delay time 213-2 are generated from detection of a current threshold value by the current detection unit 153 until on/off control of the switch element 120. In this process, the actual switching-stop-current control value with respect to the switching stop current 210-1 serving as the target generates an overshoot current value 211-1; and, with respect to the switching start current 210-2 serving as the target, the actual switching-start-current control value generates an undershoot current value 211-2.

With respect to the switching-off delay time 213-1 and the switching-on delay time 213-2, a slope 214-1 of the current value which charges energy to the step-up coil 110 and a slope 214-2 of the current value which charges energy from the step-up diode 140 to the step-up capacitor 130 are changed by the inductance values and resistance values of the battery voltage 1 and the step-up coil 110 shown in FIG. 7, the capacitance value of the step-up capacitor 130, and the resistance value of the step-up diode 140.

Therefore, even if the switching-off delay time 213-1 and the switching-on delay time 213-2 are known, the currents cannot be corrected by the step-up control unit 151 so as to be the switching stop current 210-1 serving as the target and the switching start current 210-2 serving as the target.

Therefore, there are demands for an internal combustion engine controller that carries out corrections with respect to a step-up switching stop operation and a step-up switching start operation of a step-up controller in consideration of the overshoot and undershoot due to delays of a step-up control circuit when a battery voltage and the characteristics of electronic parts mounted on a step-up circuit are changed, thereby carrying out accurate control to obtain step-up upper/lower-limit current threshold values set in advance.

Hereinafter, the present embodiment will be more specifically described.

First Embodiment

Figure 1:
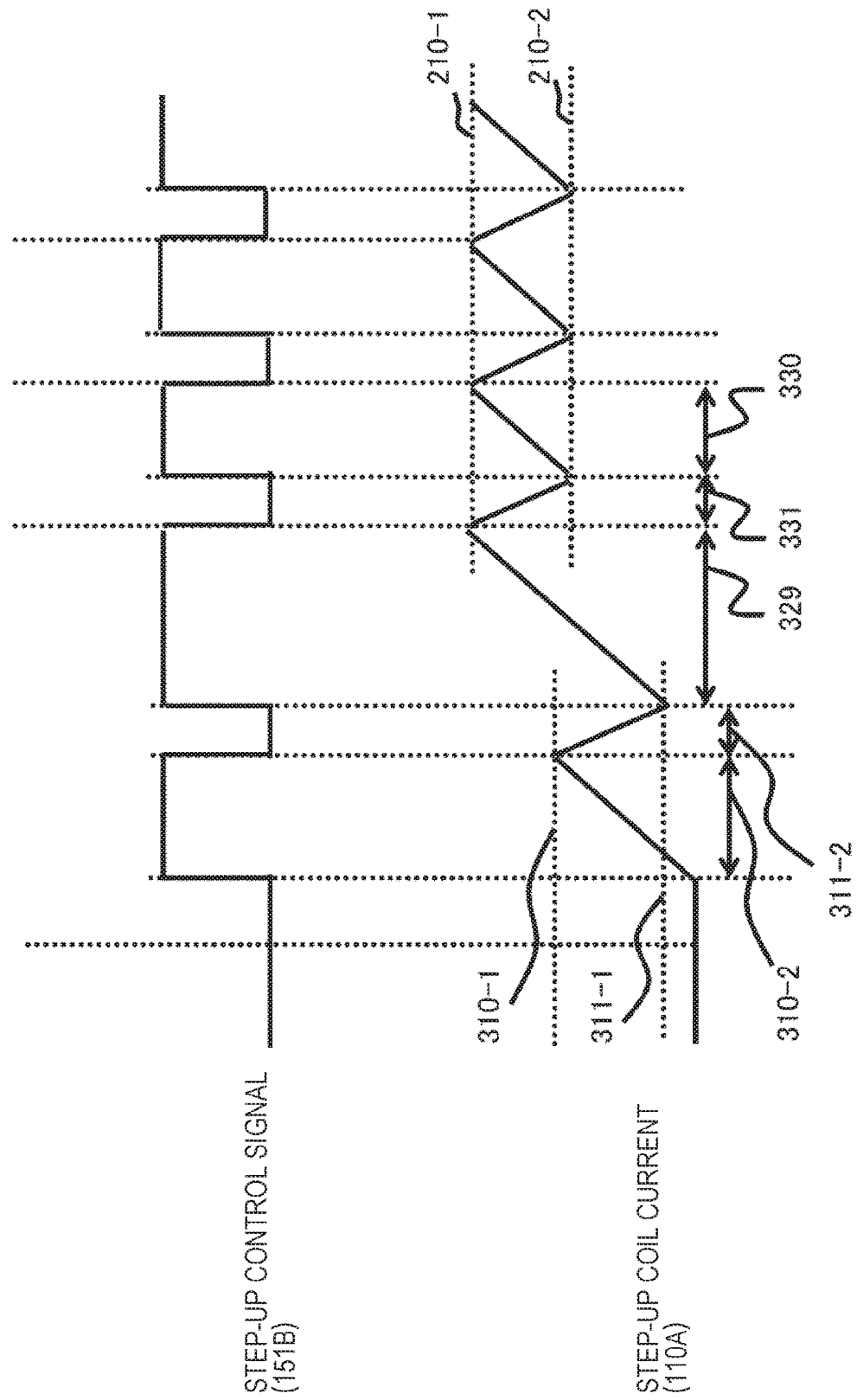
FIG. 1 is a diagram showing step-up operation waveforms of a first embodiment of an internal combustion engine controller of the present invention.
Figure 2:
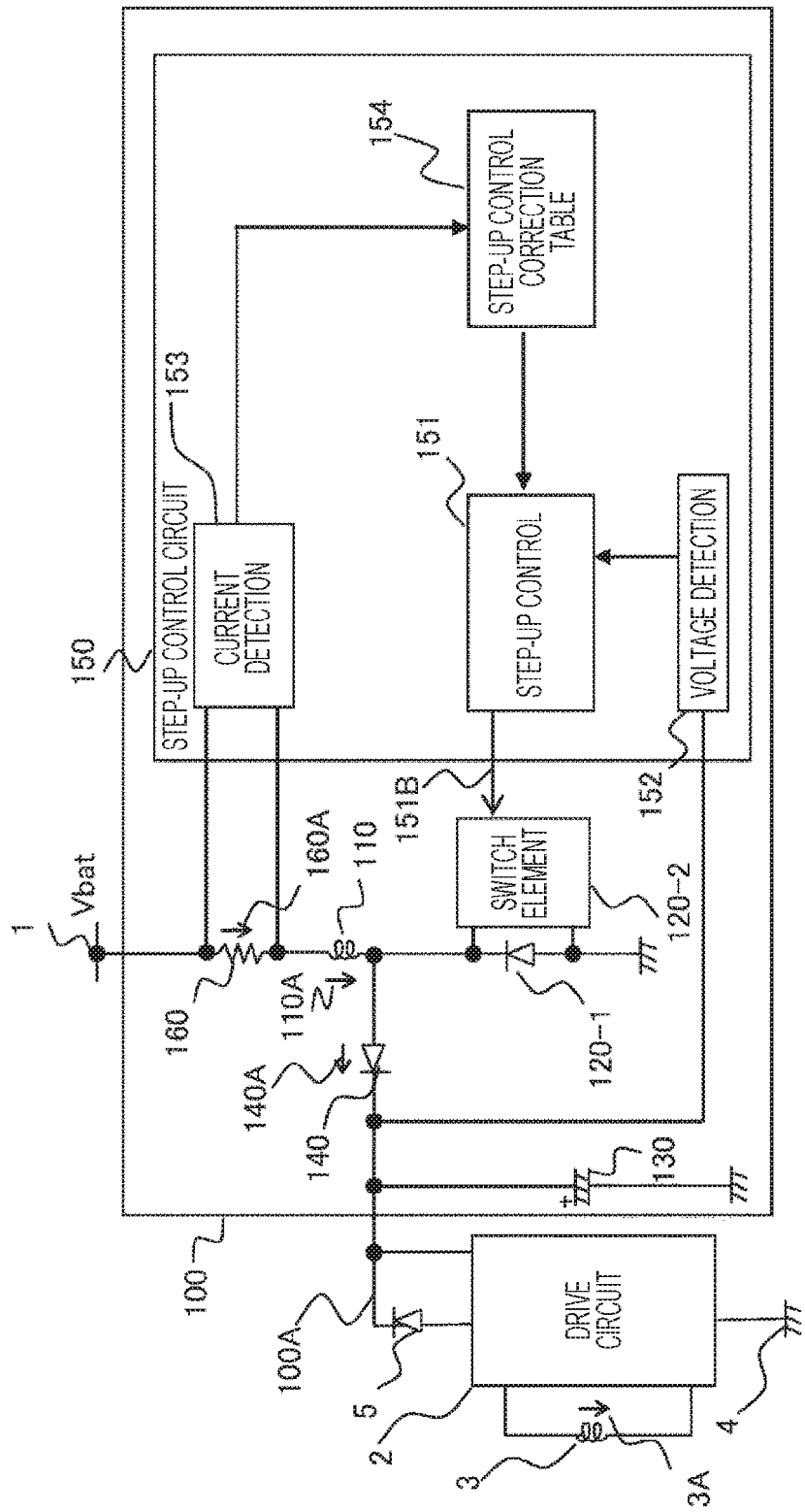
FIG. 2 is a diagram showing a circuit of the first embodiment of the internal combustion engine controller of the present invention.
Figure 3:
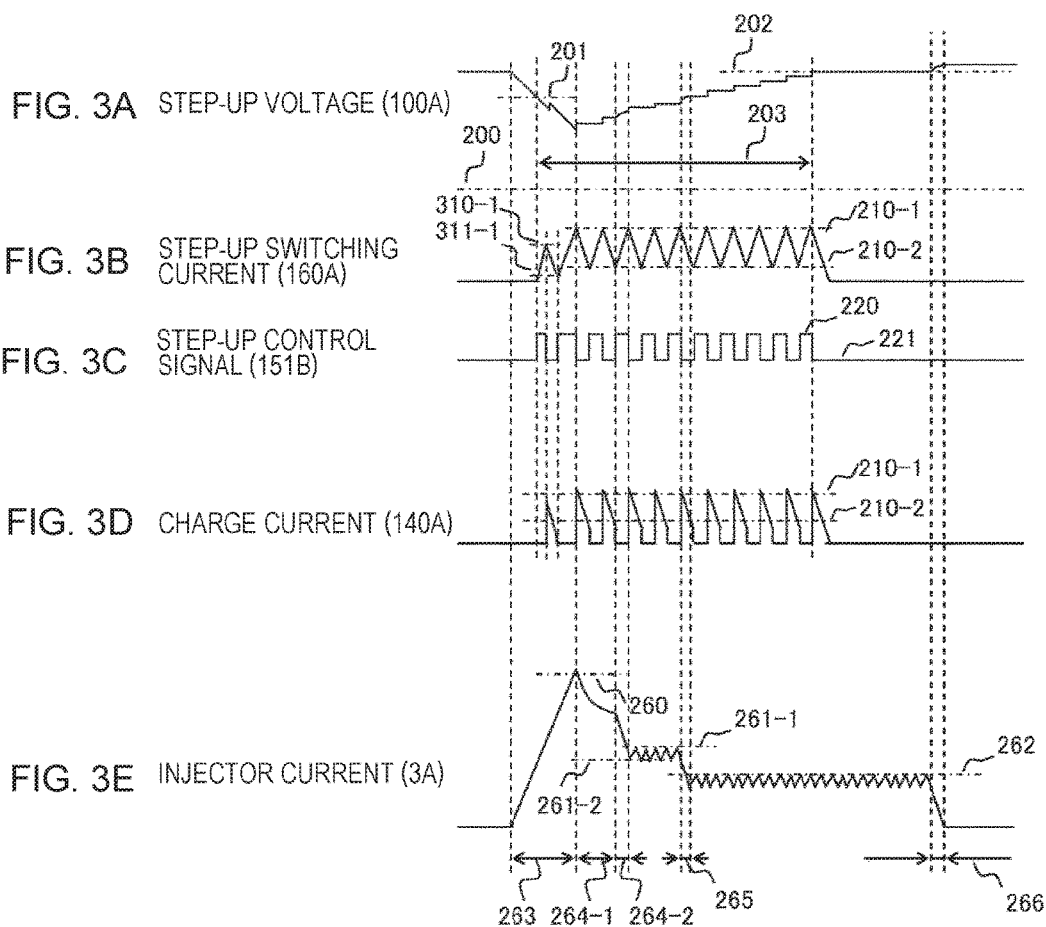
FIGS. 3A to 3E are diagrams showing entire operation waveforms of the first embodiment of the internal combustion engine controller of the present invention.

FIG. 1 shows typical operation waveforms of a first embodiment of an internal combustion engine controller of the present invention, FIG. 2 shows an exemplary configuration thereof, and FIG. 3 shows waveforms of an entire step-up operation thereof.

As shown in FIG. 2, the internal combustion engine controller of the first embodiment has a step-up circuit (100), to which power is supplied by a battery power source (1) and a power-source ground (4) thereof, and a drive circuit (2), which drives an injector (3) by using a step-up voltage (100A) increased to a high voltage by the step-up circuit (100). The internal combustion engine controller is equipped with a current regenerative diode (5) for regenerating a regeneration current of the injector (3) to the step-up circuit (100). The internal combustion engine controller is also equipped with input circuits of an engine rotation sensor and various sensors including that for the fuel pressure of a common rail, which supplies fuel to the injector. The internal combustion engine controller is further equipped with an arithmetic device which computes the power distribution timing of the injector (3) in accordance with input signals thereof, an ignition-coil drive circuit, a throttle drive circuit, and other drive circuits. The internal combustion engine controller may also include a circuit for communication with other controllers, a control circuit supporting various diagnoses and fail-safe, a power-source circuit, which supplies power thereto, etc.

The step-up circuit (100) has a step-up coil (110) having an inductance component for increasing the voltage of the battery power source (1) and includes: a step-up switch element (120-2), which distributes/shuts off the current distributed to the step-up coil; a switching-side diode (120-1), which protects the step-up switch element from minus surges; a step-up-current detection resistor (160), which converts a step-up current (160A) flowing to the step-up coil to a voltage; a charge diode (140), which is provided with a path for charging a step-up capacitor (130) with a high voltage generated by the energy accumulated in the step-up coil when the step-up switch element is shut off and prevents back-flow from the step-up capacitor (130) to the battery power source (1); and a step-up control circuit (120). The step-up control circuit includes a step-up control unit (151), a voltage detection unit (152), a current detection unit (153), and a step-up-control correction table (154), which corrects the switching time of the step-up control unit (151) based on the voltage value of the current detection unit (153).

The drive circuit (2) distributes an injector current (3A) to the injector (3) by using a step-up voltage (100A). As a result, as shown in FIG. 3, when reduction of the step-up voltage (100A) to a step-up start voltage (201) or lower is detected by the voltage detection unit (152), the step-up control unit (151) starts a slope detecting operation of the step-up current (160A). When the slope detecting operation of the step-up current (160A) is started, the step-up control unit (151) changes a step-up control signal (151B), which is for causing the step-up switch element (120-2) to distribute power, from LOW to HIGH. Herein, at the point of time when HIGH of the step-up control signal (151B) undergoes elapse of a step-up-current rising time (310-2), the current detection unit (153) measures a step-up rising current value (310-1). Then, in order to shut off the step-up switch element (120-2), the step-up control unit (151) changes the step-up control signal (151B) from HIGH to LOW. Herein, when LOW of the step-up control signal (151B) undergoes elapse of a step-up-current descending time (311-2), the current detection unit (153) measures a step-up descending current value (311-1).

Based on the step-up-current rising time (310-2), the step-up rising current value (310-1), the step-up-current descending time (311-2), and the step-up descending current value (311-1), the step-up-control correction table (154) determines first switching HIGH time (329), switching HIGH time (330), and switching LOW time (331) of the step-up control unit (151) in order to carry out control by a switching stop current (210-1) and a switching start current (210-2) satisfying step-up recovery time.

When the first switching HIGH time (330), the switching HIGH time (330), and the switching LOW time (331) of the step-up control signal (151B) are determined, a step-up operation is started. The step-up control unit (151) changes the step-up control signal (151B), which is for causing the step-up switch element (120-2) to distribute power, from LOW to HIGH for first switching HIGH time (329) As a result, a current flows from the battery power source (1) to the step-up coil (110), and energy is accumulated in the step-up coil (110).

After the first switching HIGH time (329) elapses, the step-up control signal (151B) changes the step-up control signal (151B) from HIGH to LOW for the switching LOW time (331) Herein, the current flowing to the step-up coil (110) can no longer flow to the power-source ground through the step-up switch element (120-2), and the energy accumulated by the inductance component of the step-up coil (110) generates a high voltage. If the voltage becomes higher than the voltage obtained by adding the step-up voltage (100A) accumulated in the step-up capacitor (130) and a forward voltage of the charge diode (140), the energy accumulated in the step-up coil (110) makes a transition to the step-up capacitor (130) as a charge current (110A) through the charge diode (140). In this process, the charge current (110A) starts from the switching stop current (210-1), which has been flowing to the coil immediately before the step-up switch element (120-2) is shut off, and is rapidly reduced along with the energy transition to the step-up capacitor (130). After the switching LOW time (331) elapses, the step-up control signal (151B) changes the step-up control signal (151B) from LOW to HIGH for the switching HIGH time (330). As a result, the current flows from the battery power source (1) to the step-up coil (110), and energy is accumulated in the step-up coil (110).

When the voltage detection unit 152, which detects the step-up voltage (100A), detects that the step-up voltage (100A) increased by the above-described operation is less than the step-up stop voltage (202), the step-up control unit (151) normally waits for a step-up-coil current charge time in a step-up switching cycle, which is a charge period determined in advance, and then changes a step-up control signal from LOW to HIGH in order to distribute power to the step-up switch element (120-2). This operation is repeated until the step-up voltage becomes the predetermined step-up stop voltage (202).

When the configuration as described above is employed, based on the slope (214-1) of the current value charging the step-up coil (110) with energy and the slope (214-2) of the current value charging the step-up capacitor (130) with energy from the step-up diode (140), which are changed by the inductance values and resistance values of the battery voltage (1) and the step-up coil (110) shown in FIG. 2, the capacitance value of the step-up capacitor (130), and the resistance value of the step-up diode (140), the switching-on time (330) and the switching-off time (331) are corrected with respect to the switching-off delay time (213-1) and the switching-on delay time (213-2) as shown in FIGS. 6(a) and 6(b). As a result, step-up control by a target step-up-current upper-limit value and a target step-up-current lower-limit value can be realized.

The over-time degradation of the entire step-up circuit and overshoot/undershoot cannot be controlled by changes in step-up switching control by the battery power supply voltage (1) according to PTL 3, which is a conventional example. On the other hand, in the step-up recovery time (203) according to the first embodiment of the present invention, generation of the large switching delay time (213-1) (213-2) in the step-up control circuit can be prevented. Therefore, without changing a basic circuit configuration, control can be carried out within the current threshold values for which the switching stop current (210-1) and the switching start current (210-2) of the step-up circuit are set.

Second Embodiment

Figure 4:
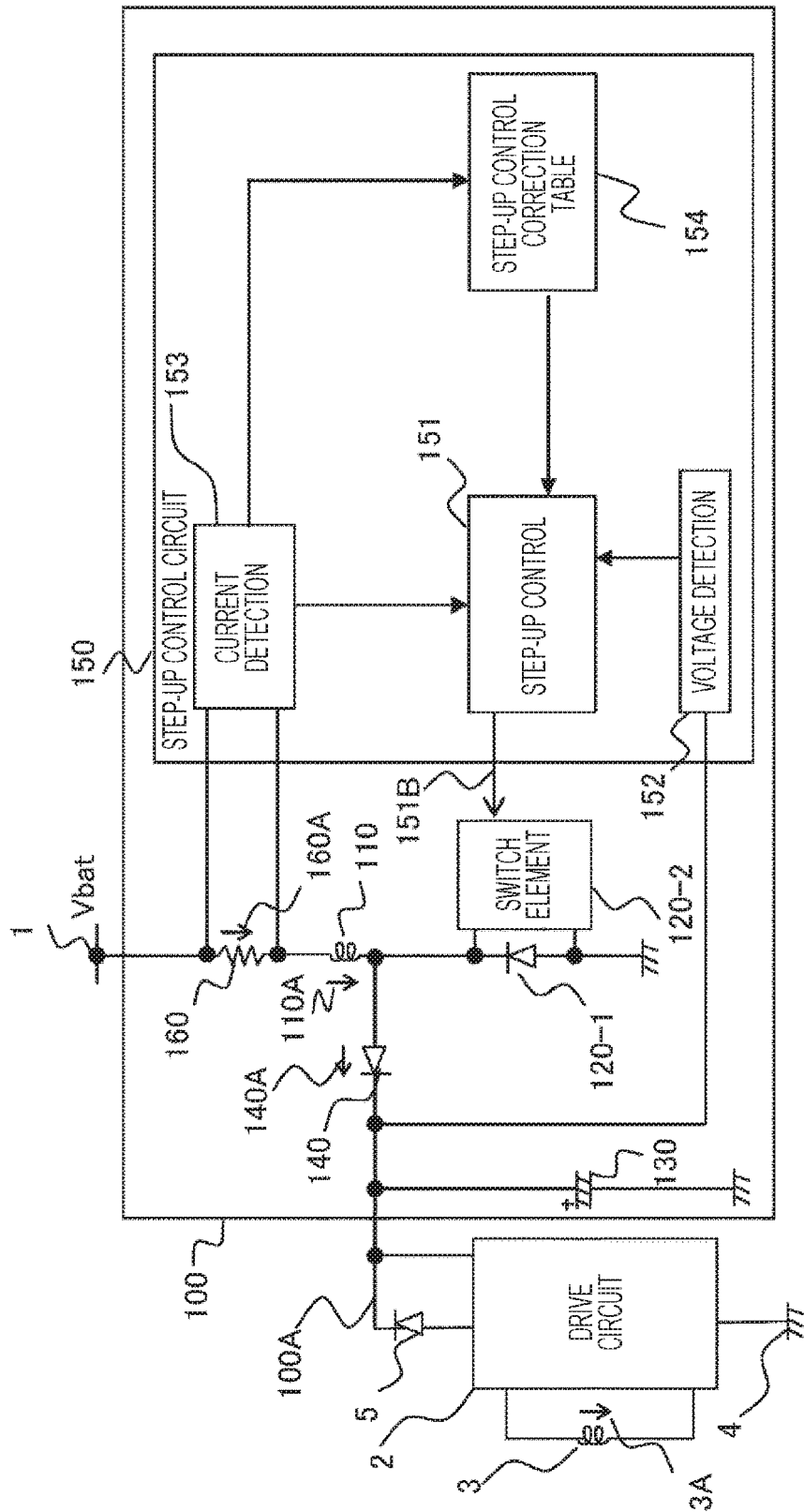
FIG. 4 is a diagram showing a circuit of a second embodiment of the internal combustion engine controller of the present invention.

FIG. 4 shows a configuration of a second embodiment of the internal combustion engine controller of the present invention.

The basic operations and configurations for detecting the slope of the step-up current are the same as those in the first embodiment, and this is an example that is adapted to the target step-up-current upper-limit value and the target step-up-current lower-limit value by using the step-up-control correction table (154).

Based on the step-up-current rising time (310-2), the step-up rising current value (310-1), the step-up-current descending time (311-2), and the step-up descending current value (311-1), the step-up-control correction table (154) determines the switching stop current (210-1) and the switching start current (210-2) satisfying the step-up recovery time. In this process, correction values for which circuit operation delays of the step-up control unit have been taken into consideration according to the step-up current slopes (214-1) (214-2) obtained by slope detection are set for the switching stop current (210-1) and the switching start current (210-2) of the step-up-control correction table (154).

When the switching stop current (210-1) and the switching start current (210-2) are determined, a step-up operation is started. The step-up control unit (151) changes the step-up control signal (151B) which is for causing the step-up switch element (120-2) to distribute power, from LOW to HIGH. As a result, a current flows from the battery power source (1) to the step-up coil (110), and energy is accumulated in the step-up coil (110).

If the step-up current (160A) exceeds the switching stop current (210-1), the step-up control signal (151B) changes the step-up control signal (151B) from HIGH to LOW. Herein, the current flowing to the step-up coil (110) can no longer flow to the power-source ground through the step-up switch element (120-2), and the energy accumulated by the inductance component of the step-up coil (110) generates a high voltage. Then, if the voltage becomes higher than the voltage obtained by adding the step-up voltage (100A) accumulated in the step-up capacitor (130) and a forward voltage of the charge diode (140), the energy accumulated in the step-up coil (110) makes a transition to the step-up capacitor (130) as a charge current (110A) through the charge diode (140). In this process, the charge current (110A) starts from the switching stop current (210-1), which has been flowing to the coil immediately before the step-up switch element (120-2) is shut off, and is rapidly reduced along with the energy transition to the step-up capacitor (130). If the step-up current (160A) becomes lower than the switching start current (210-2), the step-up control signal (151B) changes the step-up control signal (151B) from LOW to HIGH.

Figure 5:
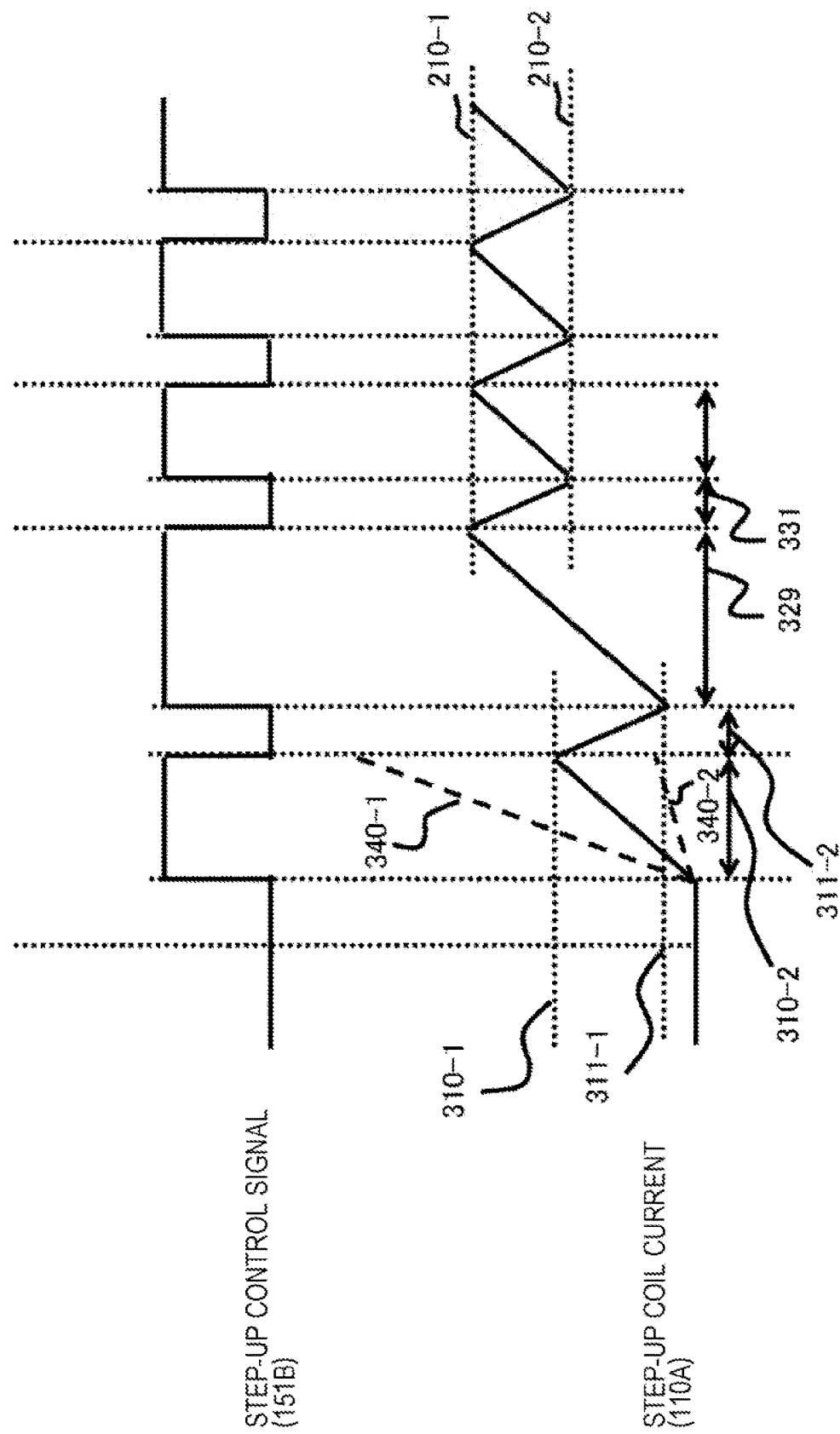
FIG. 5 is a diagram showing step-up operation waveforms of a third embodiment of the internal combustion engine controller of the present invention.

When the configuration as described above is employed, based on the slope (214-1) of the current value charging the step-up coil (110) with energy and the slope (214-2) of the current value charging the step-up capacitor (130) with energy from the step-up diode (140), the switching stop current (210-1) serving as the target and the switching start current (210-2) serving as the target are corrected with respect to the switching-off delay time (213-1) and the switching-on delay time (213-2), which are changed by the inductance values and resistance values of the battery voltage (1) and the step-up coil (110) shown in FIG. 5, the capacitance value of the step-up capacitor (130), and the resistance value of the step-up diode (140). As a result, optimum step-up control corresponding to the step-up recovery time (203) can be realized.

Note that as other modification examples, it is possible to carry out, by using the step-up-control correction table (154), step-up control in which the switching stop current (210-1) serving as the target and the switching-off time (331) are corrected, and step-up control in which the switching-on time (330) and the switching start current (210-2) serving as the target are corrected.

Third Embodiment

FIG. 5 shows a typical operation example of a third embodiment of the internal combustion engine controller of the present invention.

The basic operations and configurations are the same as those of the first and second embodiments. However, according to the present embodiment, a current-rising-slope threshold value (340-1) and a current-descending-slope threshold value (340-2) are provided in the step-up slope detection of the first embodiment and, if the current slope is beyond the two slope threshold values, a malfunction of the step-up circuit is diagnosed.

The malfunctions of the step-up circuit referred to herein indicate the malfunctions that largely affect the current slope of the step-up current (110A), such as variations in the battery voltage (1) beyond specified values, opening or short-circuit failure of the step-up coil (110), and failure of the step-up capacitor. When the control as described above is carried out, the malfunctions generated in the battery voltage (1) and the step-up circuit (100) can be detected by the step-up control circuit (120).

Fourth Embodiment

Figure 9:
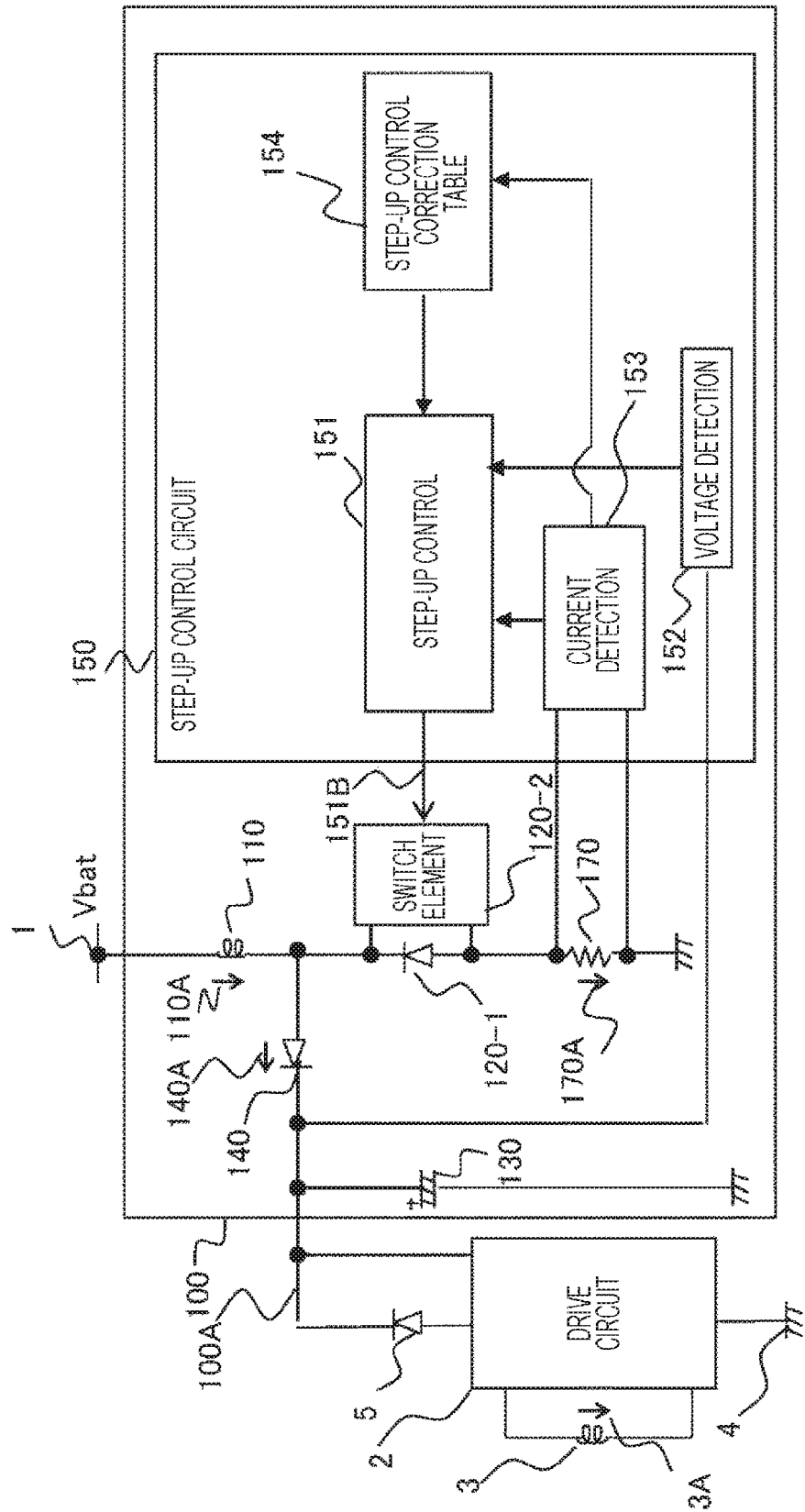
FIG. 9 is a diagram showing a circuit of the first embodiment of the internal combustion engine controller of the present invention.
Figure 10:
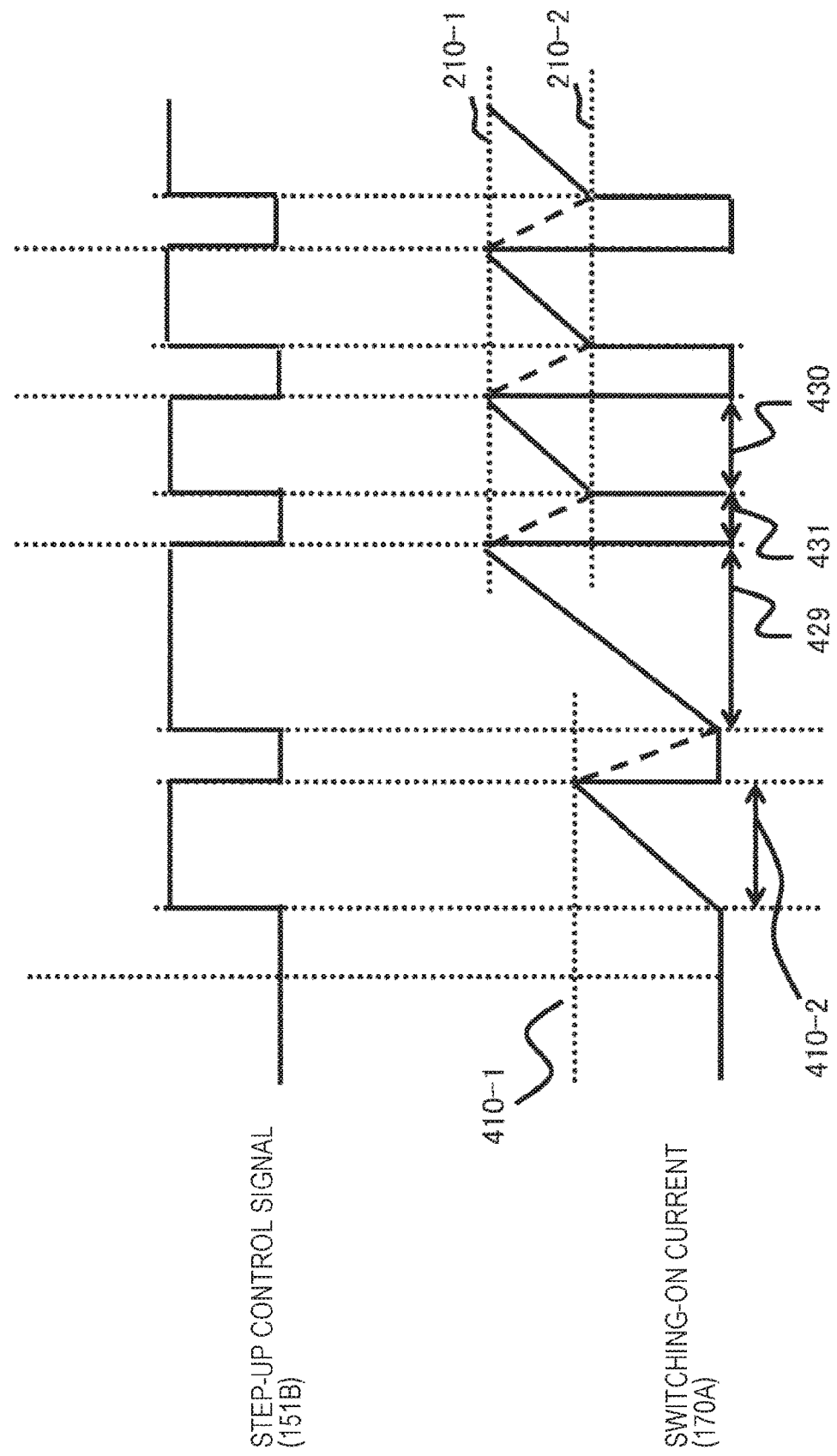
FIG. 10 is a diagram showing step-up operation waveforms of a fourth embodiment of the internal combustion engine controller of the present invention.

FIG. 9 shows a typical operation example of a fourth embodiment of the internal combustion engine controller of the present invention.

The basic operations and configurations are the same as those of the first embodiment. However, according to the present embodiment, instead of the step-up-current detection resistor (160), which is shown in FIG. 2 of the first embodiment and converts the step-up current (160A) to a voltage, a switching-on-current detection resistor (170), which converts a switching-on current (170A) to a voltage, is provided in a downstream of the step-up switch element (120-2).

The step-up control unit (151) changes the step-up control signal (151B), which is for causing the step-up switch element (120-2) to distribute power, from LOW to HIGH. Herein, at the point of time when HIGH of the step-up control signal (151B) undergoes elapse of switching-on-current rising time (410-2), the current detection unit (153) measures a switching-on rising current value (410-1). Then, in order to shut off the step-up switch element (120-2), the step-up control unit (151) changes the step-up control signal (151B) from HIGH to LOW. Based on the current slope obtained by the switching-on-current rising time (410-2) and the switching-on rising current value (410-1), the step-up-control correction table (154) determines first switching HIGH time (429) switching HIGH time (430), and switching LOW time (431) of the step-up control unit (151) in order to carry out control by the switching stop current (210-1) serving as the target and the switching start current (210-2) serving as the target satisfying step-up recovery time.

According to the present embodiment, compared with the first and second embodiments, an ESD protective element of the current detection unit (153) can be eliminated by using the switching-on-current detection resistor provided in the downstream of the step-up switch element. Moreover, since the switching LOW time (431) is corrected by the current slope obtained by the switching-on-current rising time (410-2) and the switching-on rising current value (410-1), correction waveforms and correction control can be simplified.

REFERENCE SIGNS LIST 1 battery power source
2 injector drive circuit
3 injector
3A injector current
4 power-source ground
5 current regenerative diode
100 step-up circuit
100A step-up voltage
110 step-up coil
110A step-up coil current
120 step-up switching FET
120-1 switching-side diode
120-2 step-up switch element
140 charge diode
140A charge current
130 step-up capacitor
150 step-up control circuit
151 step-up control unit
151B step-up control signal
152 voltage detection unit
153 current detection unit 154 step-up-control correction table
160 step-up-current detection resistor
160A step-up current
170 switching-on-current detection resistor
170A switching-on current
200 power-source ground voltage
201 step-up start voltage
202 step-up stop voltage
203 step-up return period
210-1 switching stop current
210-2 switching start current
211-1 overshoot current
211-2 undershoot current
213-1 switching-off delay time
213-2 switching-on delay time
214-1 step-up-current rising slope
214-2 step-up-current descending slope
220 switching ON signal
221 switching OFF signal
260 peak-current stop current
261-1 retention 1 rise stop current
261-2 retention 1 descend stop current
262 retention 2 stop current
263 peak-current distribution period
264-1 peak-current slow-descending period
264-2 peak-current rapid-descending period
265 retention 1 current descending period
266 distribution-current descending period
310-1 step-up rising current value
310-2 step-up-current rising time
311-1 step-up descending current value
311-2 step-up-current descending time
329 first switching HIGH time
330 switching HIGH time
331 switching LOW time
410-1 switching-on rising current value
410-2 switching-on current rising time
429 first switching HIGH time
430 switching HIGH time
431 switching LOW time

The invention claimed is:

1. An internal combustion engine controller comprising:
a step-up coil connected to a battery power source and configured to increase a voltage of the battery power source;
a switching element connected to the step-up coil and configured to distribute or shut off a current to the step-up coil;
a step-up capacitor configured to accumulate current energy of an inductance component from the step-up coil; and
a step-up control circuit configured to control the switching element by a step-up current distributed to the step-up coil to charge the step-up capacitor with a high voltage generated at the step-up coil,
wherein the step-up control circuit corrects on/off control of the switching element in accordance with a change in the step-up current.

2. The internal combustion engine controller according to claim 1, wherein a correction waveform is used in order to measure the slope of the step-up current.

3. The internal combustion engine controller according to claim 1, wherein the switching element has on/off control, and the on/off control is set as a slope detection time, respective current values of on-time and off-time are measured, and the slope of the step-up current is detected.

4. The internal combustion engine controller according to claim 1, configured to constantly maintain step-up recovery time by carrying out control to extend the on-time and off-time of the switching element when a current slope of the step-up current has a first value and carrying out control to shorten the on-time and off-time of the switching element when the current slope of the step-up current has a second value that is larger than the first value.

5. The internal combustion engine controller according to claim 1, wherein the current slope of the step-up current is detected, and the on/off control of the switching element is corrected so as to suppress an overshoot and an undershoot of the step-up current caused by a circuit delay of the step-up control circuit.

6. The internal combustion engine controller according to claim 1, configured to carry out the on/off control of the switching element by corrected time control for the on-time of the switching element and corrected time control for the off-time of the switching element according to a current-slope detection result of the step-up current.

7. The internal combustion engine controller according to claim 1, configured to carry out the on/off control of the switching element by corrected time control for the on-time of the switching element and corrected step-up upper-limit current detection control for the off-time of the switching element according to a current-slope detection result of the step-up current.

8. The internal combustion engine controller according to claim 1, configured to carry out the on/off control of the switching element by corrected step-up lower-limit current detection control for the on-time of the switching element and corrected time control for the off-time of the switching element according to a current-slope detection result of the step-up current.

9. The internal combustion engine controller according to claim 1, configured to carry out the on/off control of the switching element by corrected step-up upper-limit current detection control for the on-time of the switching element and corrected step-up lower-limit current detection control for the off-time of the switching element according to a current-slope detection result of the step-up current.

10. The internal combustion engine controller according to claim 1, comprising a failure diagnosis of measuring the slope of the step-up current value and determining open failure when the slope is smaller than a slope diagnosis threshold value and determines short-circuit failure when the slope is larger than the diagnosis threshold value.

11. The internal combustion engine controller according to claim 1, wherein the step-up control circuit corrects the on/off control of the switching element in accordance with a slope of the step-up current such that step-up recovery time of the step-up capacitor is close to a constant value.

12. An internal combustion engine controller comprising:
a step-up coil connected to a battery power source and configured to increase a voltage of the battery power source;
a switching element connected to the step-up coil and configured to distribute or shut off a current to the step-up coil;
a switching-on current detection resistor connected to a downstream of the switching element and configured to detect the current when switching is on;
a step-up capacitor configured to accumulate current energy of an inductance component from the step-up coil; and
a step-up control circuit configured to control the switching element by a switching-on current distributed to the switching-on current detection resistor to charge the step-up capacitor with a high voltage generated at the step-up coil, wherein the step-up control circuit measures a slope of the switching-on current and corrects on/off control of the switching element.

13. The internal combustion engine controller according to claim 12, wherein a correction waveform is used in order to measure the slope of the switching-on current.

14. The internal combustion engine controller according to claim 13, wherein the switching element has an on control, and the on control set as a slope detection time, a current value of on-time is measured, and the slope of the switching-on current is detected.

15. The internal combustion engine controller according to claim 14, configured to constantly maintain step-up recovery time by carrying out control to extend the on-time of the switching element so as to increase an upper-limit current value of the step-up current when a current slope of the correction waveform has a first value, carrying out control to shorten the on-time of the switching element so as to reduce the upper-limit current value of the step-up current when the current slope of the correction waveform has a second value that is larger than the first value, and, in off-time of the switching element, correcting time control according to the current slope of a switching-on period of the correction waveform.

* * * * *